United States Patent
Chou et al.

(10) Patent No.: US 8,982,727 B2
(45) Date of Patent: Mar. 17, 2015

(54) SYSTEM AND APPARATUS OF GENERALIZED NETWORK CONTROLLER FOR A SOFTWARE DEFINED NETWORK (SDN)

(71) Applicant: Futurewei Technologies, Inc., Plano, TX (US)

(72) Inventors: Wu Chou, Basking Ridge, NJ (US); Min Luo, Cumming, GA (US); Ke Lin, Hangzhou (CN)

(73) Assignee: Futurewei Technologies, Inc., Plano, TX (US)

( * ) Notice: Subject to any disclaimer, the term of this patent is extended or adjusted under 35 U.S.C. 154(b) by 88 days.

(21) Appl. No.: 13/801,531

(22) Filed: Mar. 13, 2013

(65) Prior Publication Data
US 2014/0112190 A1 Apr. 24, 2014

Related U.S. Application Data (60) Provisional application No. 61/716,985, filed on Oct. 22, 2012.

(51) Int. Cl.
| | |
|---|---|
| *H04L 12/28* | (2006.01) |
| *H04B 7/212* | (2006.01) |
| *H04L 1/00* | (2006.01) |
| *H04L 12/26* | (2006.01) |
| *H04L 12/24* | (2006.01) |

(52) U.S. Cl.
CPC .................................. *H04L 41/0213* (2013.01)
USPC ........... 370/254; 370/321; 370/235; 709/220; 709/238

(58) Field of Classification Search
None
See application file for complete search history.

(56) References Cited

U.S. PATENT DOCUMENTS

| | | | |
|---|---|---|---|
| 2009/0248392 A1 | 10/2009 | Talwar et al. | |
| 2012/0250496 A1 | 10/2012 | Kato | |

(Continued)

FOREIGN PATENT DOCUMENTS

| | | |
|---|---|---|
| CN | 102640464 A | 8/2012 |
| WO | 2012066830 A1 | 5/2012 |

OTHER PUBLICATIONS

McKeown et al., "OpenFlow: Enabling Innovation in Campus Networks", Mar. 14, 2008, OpenFlow.org, all pages.*

(Continued)

*Primary Examiner* — Kwang B Yao
*Assistant Examiner* — Adam Duda
(74) *Attorney, Agent, or Firm* — Conley Rose, P.C.; Grant Rodolph; Brandt D. Howell (57) ABSTRACT

A generalized network controller in a software defined network (SDN), controlling a network with mixed switches based on different and even incompatible OpenFlow (OF) standard versions, comprising a first transceiver connected to a first OF switch comprising a first OF standard version configured to receive messages from the first OF switch and to transmit messages to the first OF switch; a second transceiver connected to a second OF switch comprising a second OF standard version configured to receive messages from the second OF switch and to transmit messages to the second OF switch, wherein the first OF standard version is different from the second OF standard version, and wherein the first OF standard version is incompatible with the second OF standard version; and a processor coupled to the first and second transceivers and configured to control the first and the second OF switches.

20 Claims, 4 Drawing Sheets

(56) References Cited

U.S. PATENT DOCUMENTS

| | | | |
|---|---|---|---|
| 2013/0112192 A1* | 5/2013 | Fosdick et al. | 127/30 |
| 2013/0176889 A1 | 7/2013 | Ogawa | |
| 2014/0112190 A1* | 4/2014 | Chou et al. | 370/254 |
| 2014/0146674 A1* | 5/2014 | Wang et al. | 370/235 |
| 2014/0185450 A1* | 7/2014 | Luo et al. | 370/236 |

OTHER PUBLICATIONS

McKeown, "OpenFlow (Or: "Why Can't I innovate in my wiring closet?")", earliest known publication date: Aug. 28, 2013, OpenFlow.org, all pages.*

Open Networking Foundation, "Open Flow Management and Configuration Protocol (OF-Contig 1.1)," Version 1.1, Jun. 25, 2012, 117 pages.

Open Networking Foundation, "OpenFlow Configuration and Management Protocol (OF-Contig 1.0)," 2011, 73 pages.

Open Networking Foundation, "OpenFlow Switch Specification, Version 1.0.0, (Wire Protocol 0x01)," Dec. 31, 2009, 42 pages.

Open Networking Foundation, "OpenFlow Switch Specification, Version 1.1.0 Implemented, (Wire Protocol 0x02)," Feb. 28, 2011, 56 pages.

Open Networking Foundation, "OpenFlow Switch Specification, Version 1.2, (Wire Protocol 0x03), " Dec. 5, 2011, 83 pages.

Open Networking Foundation, "OpenFlow Switch Specification, Version 1.3.0, (Wire Protocol 0x04)," Jun. 25, 2012, 106 pages.

Open Networking Foundation, "OpenFlow Switch Specification, Version 1.3.1, (Wire Protocol 0x04)," Sep. 6, 2012, 128 pages.

Foreign Communication From A Counterpart Application, PCT Application No. PCT/CN2013/085638, International Search Report dated Jan. 23, 2014, 6 pages.

Foreign Communication From a Counterpart Application, PCT Application No. PCT/CN2013/085638, Written Opinion dated Jan. 23, 2014, 5 pages.

* cited by examiner

SYSTEM AND APPARATUS OF GENERALIZED NETWORK CONTROLLER FOR A SOFTWARE DEFINED NETWORK (SDN)

CROSS-REFERENCE TO RELATED APPLICATIONS

The present application claims the benefit of U.S. Provisional Patent Application No. 61/716,985 filed Oct. 22, 2012 by Min Luo, et al. and entitled "System and Apparatus of Generalized Network Controller for a Software Defined Network (SDN)," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a new form of network architecture in which the control plane is separated from the data plane and implemented as a software application. This architecture allows network administrators to have programmable logically centralized control of network traffic without requiring physical access to the network's hardware devices. Thus, SDN decouples network control (learning and forwarding decisions) from network topology (junctions, interfaces, and how they peer). Decoupling network control from network topology enables better routing decisions and resource utilization based on centrally collected and managed global network topology, states, and applications or traffic flow patterns. SDN may simplify network operations, where centralized controller can pre-specify alternate routing path and configure network equipment automatically, and global definitions per identity do not have to be matched to each and every interface location. The basic approach to achieve decoupling of the network control from the network topology is by applying globally aware and topology decoupled software control at the edges of the network. The assumption is that traditional topology-coupled bridging and routing drives the core of the network so that scalability, interoperability, high-availability, and extensibility of Internet Protocol (IP) networks can be maintained.

In one configuration of an SDN, the network control plane hardware is physically decoupled from the data forwarding plane hardware, e.g., a network switch forwards packets and a separate server or controller operates the network control plane. SDN may require some method for the control plane to communicate with the data plane. One mechanism to do so is through OpenFlow (OF) which is a standard protocol or interface for controlling networking switches. However, as SDN evolves rapidly, standards become incompatible, requiring dedicated network controllers for each version of the standards. For example, OpenFlow 1.2 is not backward compatible with OpenFlow 1.0. As a consequence, an OpenFlow 1.0 controller may be required to control OpenFlow 1.0 switches and an OpenFlow 1.0 based network. Correspondingly, an OpenFlow 1.2 controller may be required to control OpenFlow 1.2 switches and an OpenFlow 1.2 based network. This can lead to network fragmentation by protocols, which can become an acute problem in data networking of SDN for potential customers and the telecommunications industry.

SUMMARY

In one embodiment, the disclosure includes a generalized network controller in a SDN, comprising a first transceiver connected to a first OF switch comprising a first OF standard version configured to receive messages from the first OF switch and to transmit messages to the first OF switch; a second transceiver connected to a second OF switch comprising a second OF standard version configured to receive messages from the second OF switch and to transmit messages to the second OF switch, wherein the first OF standard version is different from the second OF standard version, and a processor coupled to the first and second transceivers and configured to control the first and the second OF switches.

In another embodiment, the disclosure includes a method for controlling a plurality of OF switches corresponding to different OF standard versions in a generalized network controller in a SDN, comprising receiving at a receiver an incoming message from a first one of the OF switches, wherein at least two of the OF switches correspond to different non-compatible versions of an OF standard; translating with a processor the incoming message into a version independent message; processing with the processor the version independent message to generate a network management outgoing message to a second one of the OF switches; and translating the outgoing message into a version dependent message corresponding to a version compatible with the second one of the OF switches.

In another embodiment, the disclosure includes, a computer program product executable by a processor in a network controller in a SDN, the computer program product comprising computer executable instructions stored on a non-transitory computer readable medium that when executed by the processor cause the network controller to perform the following: receive an incoming message from a first one of the OF switches, wherein at least two of the OF switches correspond to different non-compatible versions of an OF standard; translate the incoming message into a version independent message; process the version independent message to generate a network management outgoing message to a second one of the OF switches; and translate the outgoing message into a version dependent message corresponding to a version compatible with a second one of the OF switches.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To overcome the complexity and manageability problems with the IP-based networks, SDN emerged as a potential solution since its introduction in 2008 and has attracted research and development (R&D) interests from both academia and industries, especially in the last two years. SDN decouples data forwarding capability from routing, resource and other management needs, while all such management or control functionality that is distributed in IP networks are logically centralized into a controller. To enable SDN, a new standard OF protocol has been established to specify the proper interaction between the controller(s) and the switches. With the global network topology and state, dynamic traffic flow/volume information, the controller(s) can make better and globally optimized decisions on how to assign network resources and route different application/information flows through the network.

Since the first OF standard (e.g., OF 1.0) was first published in 2009, the OF standards have been evolving rapidly with the advances in SDN technologies. To enhance the flexibility, reliability, and advanced networking capabilities, the subsequent standard releases after OF 1.0, e.g., OF 1.1 and 1.2, introduced many core functionalities, such as multi-flow tables and multi-controllers, in addition to other functional features such as support for IP version 6 (IPv6), and Multi-protocol Label Switching (MPLS). These desired new capabilities came with a cost in terms of their renewed complexity and in the difficulty for efficient system architecture and implementation, regardless of the version of OF controller or switch.

Changes in OF 1.1 and 1.2 are so significant that the Open Networking Foundation (ONF) declared OF 1.2/1.1 as being incompatible with OF 1.0. It should be feasible to design a network controller for each version of the OF standard. However, many incompatible controllers running on the control plane can lead to a network management nightmare. Furthermore, the incompatible protocols, switches, and controllers can also cause network fragmentation.

Since OF 1.2 is not only incompatible with 1.0, but technically much more difficult to design and implement for both the switches and the controllers, currently almost all vendors only provide OF 1.0 switches. Therefore, early adopters may have to use OF 1.0 technology, while waiting for the availability of OF 1.2 or newer version products. If the two kinds of technology remain incompatible, early adopters would have to invest again and abandon their earlier infrastructure based on OF 1.0 once OF 1.2 or newer standard version based products become available.

Disclosed herein is a generalized network controller that may discover and manage a network with mixed switches supporting different OF standard versions, thereby eliminating or substantially mitigating the possibility of segmented network "islands" caused by incompatible network control plans. In this way, investments from earlier adopters would not be wasted, and encourage more companies to start testing and putting OF technologies into operation. Moreover, it made it possible for a logically centralized SDN controller to control the entire network so that the full benefits of SDN can be realized. The generalized network controller described herein is based on an abstract network control data model that can map the semantics of version specific messages into version independent messages and semantics based on the said data model where the network independent messages are processed. The said generalized network controller may generate version independent messages and translate them into a format compatible with the version of the network switch to which the message is intended. The different functionalities of the different standards may be modeled in a version independent environment of the said data model. The disclosed generalized network controller may control mixed or hybrid switch based data networking with switches conforming to different OF standards. The disclosed generalized network controller may provide topology discovery and version negotiation to meet the needs of inter-operability of such mixed network elements.

The disclosed generalized network controller and controller processing mechanism may support standardization, normalization, and translation that may enable one said generalized network controller to effectively and efficiently process messages from both OF 1.2 and OF 1.0 switches as well as other standard version of OF switches, where the message from the OF 1.2 switches and the messages from the 1.0 switches or others may be incompatible. The disclosed abstract network control data model mechanism may provide factory patterns with sufficient abstraction of common message attributes to generalize message definition while enabling individual messages from different switch types to be distinctly defined and instantiated. Many controller modules and logic in the said generalized network controller may be able to process only the common standardized messages while some modules may only need to process specific incompatible parts of an OF 1.0 or OF 1.2 message through normalization and translation. The disclosed mechanism may substantially minimize the overhead involved in managing and controlling OF switches of different version types in a SDN environment. But most importantly, the said generalized controller can control the entire SDN and eliminate the network fragmentation problem caused by incompatible network control plan protocols.

Figure 1:
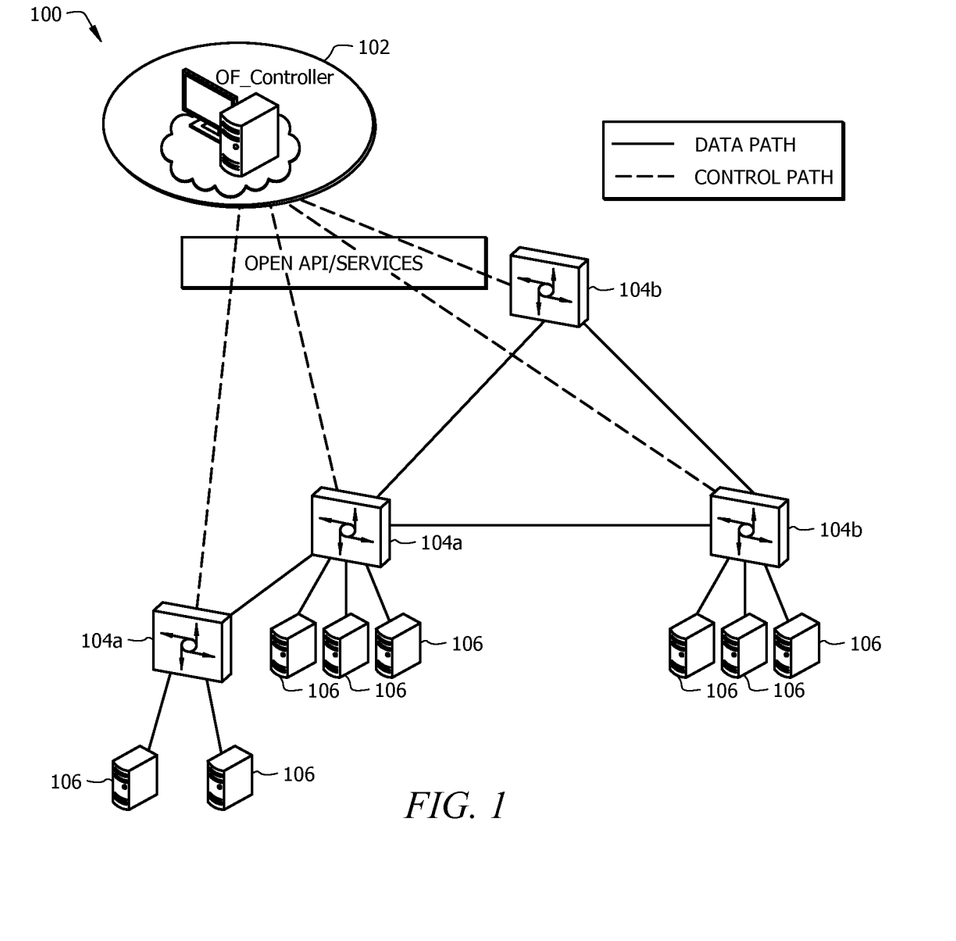
FIG. 1 is a schematic diagram of a SDN according to a disclosed embodiment.

FIG. 1 is a schematic diagram of a SDN 100 according to a disclosed embodiment. The SDN 100 may comprise a network controller 102, a plurality of OF switches 104, and a plurality of host computers 106. The control path is represented by dashed lines and the data path is represented by solid lines. System configuration, management information, and routing table information may be exchanged between the network controller 102 and the OF switches 104 via the control path. Data packets are forwarded between OF switches 104 via the data path. The network controller 102 may be a generalized network controller configured to control the OF switches 104. The network controller 102 may be configured to perform control path or control plane functionality, such as drawing a network map and defining the information in a routing table that defines what to do with incoming packets. The network controller 102 may be configured for management and control functionality of the control plane, which may include routing and resource management. The OF switches 104 may be any device that receives and transmits data through the SDN network 100 according to an OF standard. Some of the OF switches 104 may correspond to and be configured according to a different OF standard from that of other ones of the OF switches 104. Furthermore, the different OF standards may be incompatible with the other OF standards used by other OF switches 104. For example, switches 104a may support OF version 1.0 standard, but not later versions, while switches 104b may support version 1.2 of OF standard, but not earlier versions.

The OF controller 102 may receive messages from and transmit messages to the OF switches 104. Some of the incoming messages or parts of the incoming messages may be translated into a standard independent format (e.g., a format that is independent of the OF 1.0 or OF 1.2) for processing by some of the modules in the OF controller 102. The standard independent format may be based on an abstract network control data model which provides an abstraction of the attributes or features of the various standard formats. The generalized network controller 102 may interact with the OF switches 104 via any of a number of OF protocols. The network controller 102 may determine the global network topology of the network 100. With the global network topology, state information, dynamic traffic flow/volume information, and other network state information, the network controller 102 may make decisions on how to assign resources and route different application/information flows through the network 100.

Figure 2:
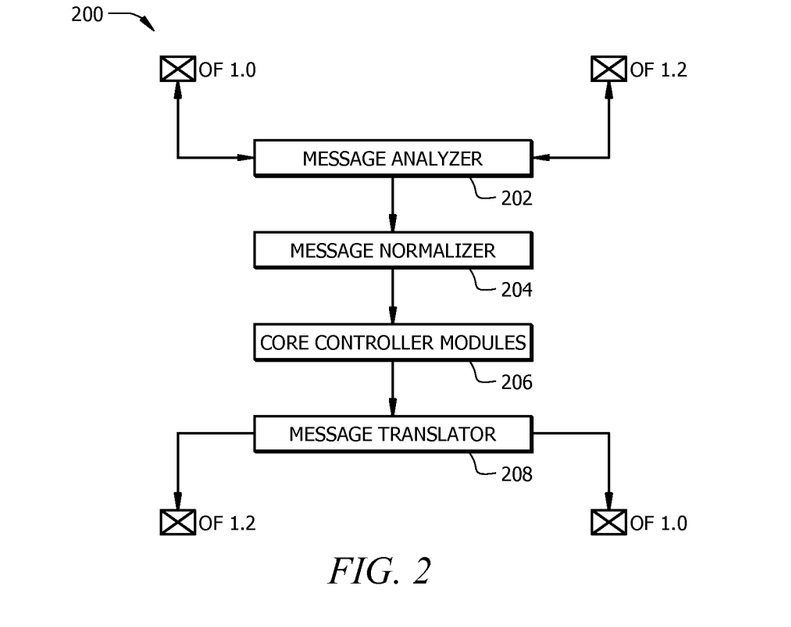
FIG. 2 is a schematic diagram of a generalized network controller in accordance with a disclosed embodiment.

FIG. 2 is a schematic diagram of a generalized network controller 200 in accordance with a disclosed embodiment. The network controller 200 may be implemented as network controller 102. Network controller 200 may process messages from different types of OF switches wherein some of the OF switches operate according to one OF standard or version and other OF switches operate according to one or more other OF standards or versions. As used herein, standards and versions may be used interchangeably. For example, some of the OF switches may operate according to OF version 1.2 while other OF switches may operate according to OF version 1.0.

Figure 3:
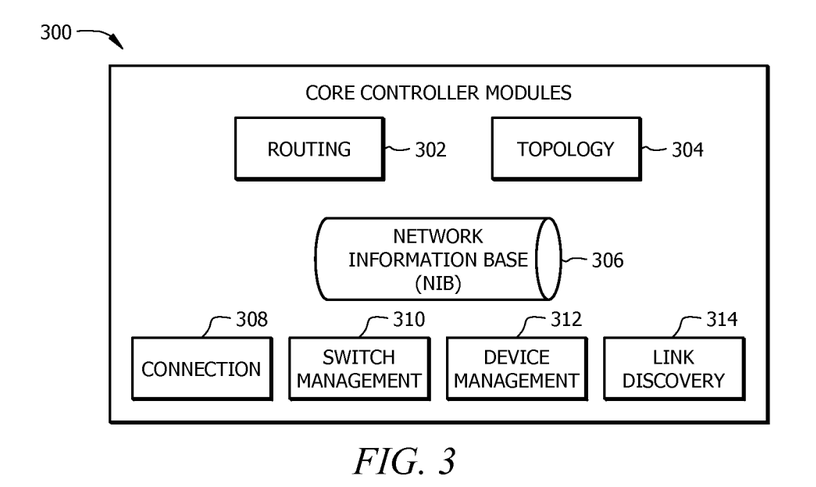
FIG. 3 is a schematic diagram of core controller modules in accordance with a disclosed embodiment.

The network controller 200 may comprise a message analyzer 202, a message normalizer 204, one or more core controller modules 206, and a message translator 208. The message analyzer 202 may decipher the version of the incoming message, e.g., OF version 1.0 or 1.2. The message normalizer 204 may extract features from two or more OF versions from the original messages and create a version or standard independent message in one or more interested modules in the network controller 200. The version or standard independent message may comprise a standardized internal message format or a normalized message. The core controller modules 206 may be categorized as OF version independent or OF version dependent. Version independent modules may process the standardized internal message in a unified way independent of the version in which the original message was received. The version dependent modules may consider the version of the original message and process a version dependent message. FIG. 3 provides more details of the core control modules 206. The message translator 208 may compose or construct new outbound message(s) from the processed message(s). The new outbound messages may be constructed according to the version of the OF switch to which the message is intended. Thus, the outbound messages may be version dependent, e.g., readable and usable by the particular OF switch to which the message may be transmitted.

FIG. 3 is a schematic diagram of core controller modules 300 in accordance with a disclosed embodiment. The core controller modules 300 may be implemented as core controller modules 206 in FIG. 2. The core controller modules 300 may comprise a routing module 302, a topology module 304, a network information base (NIB) 306, a connection module 308, a switch management module 310, a device management module 312, and a link discovery module 314. In other embodiments, the core controller modules 300 may include more, fewer, and/or different modules from those depicted in FIG. 3. The routing module 302 may determine a path from an ingress OF switch in an SDN network (e.g., SDN network 100 in FIG. 1) across the SDN network to an egress OF switch. The path may include one or more intermediary OF switches between the ingress OF switch and the egress OF switch. The topology module 304 may determine the network topology of the SDN network. The network topology may comprise the connections between the various OF switches in the SDN network and the version or type of OF switch. The network topology may include the physical topology and/or the logical topology. The physical topology of the network may comprise information about the placement of various components in the network including, for example, the device location and cable installation. The logical topology may show how the data flows within the SDN network regardless of physical design, with some form of virtualization.

The NIB 306 may be a database, a data table, or other data store either in memory or file system that may store lists of routes from some particular network sources or to particular destinations. The NIB 306 may include metrics (e.g., distances, capacity, usage costs, etc.) associated with the links or such stored routes. The NIB 306 may comprise information about the topology of the SDN network. The connections module 308 may determine which OF switches are connected and the type of connection between the OF switches. The switch management module 310 may manage the switching functions of the OF switches. The device management module 312 may manage the host computers that are connected to the OF switches. Managing the OF switches may include issuing routing instructions, providing software and/or firmware updates, or restarting an OF switch, etc. The link discovery module 314 may determine when logical or physical links between various OF switches are created and/or destroyed.

Figure 4:
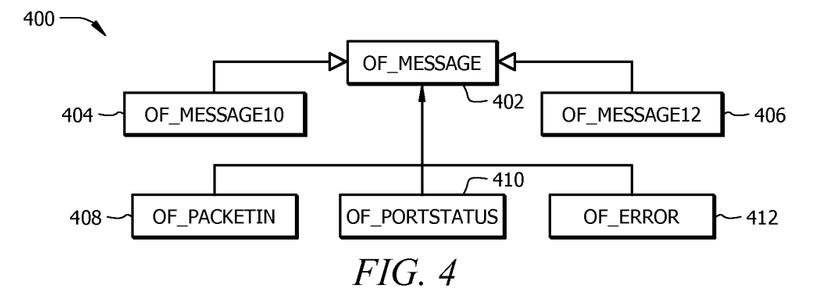
FIG. 4 is a schematic diagram illustrating a message standardization scheme for OF messages in accordance with a disclosed embodiment.

To enable uniform treatment of message types, a generic message type OF_Type was defined, and the version specific OF_Type10 and OF_Type12 were defined as subclasses of OF_Type, as depicted in FIG. 4. All three message types are instantiable.

FIG. 4 is a schematic diagram illustrating a message standardization scheme 400 for OF messages in accordance with a disclosed embodiment. The message standardization scheme 400 may standardize or translate various OF messages into a single message format that may be processed by version independent core controller modules, such as core controller modules 206 in FIG. 2 or core controller modules 300 in FIG. 3. The single message format may be defined as OF_Message 402. OF_Message10 404 (which may correspond to OF version 1.0) and OF_Message12 406 (which may correspond to OF version 1.2) may be translated into OF_Message 402. Other message types, such as OF_PacketIn 408, OF_PortStatus 410, and OF_Error 412, as defined in the Rev. 1.0 and Rev. 1.2 for the OF specification of the OF Organization, may also be translated into OF_Message 402 for processing. The OF_PacketIn 408 may be the first packet from an OF switch. The OF switch may have received the OF_PacketIn 408 from a source node and may be unable to find proper directives on how to process the OF_PacketIn 408 and other packets that belong to the same flow. The OF_PacketIn 408 may be sent to the network controller to determine the proper directives and processing decisions. The OF_PortStatus 410 may be a message from an OF switch to the network controller when the port status changes, such as a port is added, modified, and/or removed from the data path. The OF_Error 412 may be a message that an OF switch transmits to the OF controller where a problem occurs. The translator of these messages 404, 406, 408, 410, 412 may be message normalizer 204 shown in FIG. 2 and described above. OF_Message 402 may be defined as the highest abstract class for any OF message in disclosed abstract network control data models. Both OF_Message10 404 and OF_Message12 406 may be subclasses of OF_Message 404. Other messages corresponding to other OF versions or standards may also be included and may be subclasses of OF_Message 404. A factory pattern may be used to manage the instantiation of all OF messages of any specific version while an interface OF_Message.getType( ) may be used to get common OF_Types for all individual modules. After the OF message is abstracted and a general mechanism for managing the life cycle of each type of message is available, matching and actions may be extended accordingly. Persons of ordinary skill in the art are aware that the OF messages discussed above may be compliant with other versions of the OF specification.

Table 1 shows various messages, corresponding message types, and modules according to a disclosed embodiment.

TABLE 1

| | Messages | Message Type | Modules |
|---|---|---|---|
| Controller Incoming | PacketIn PortStatus Error | OF_Type | All interested Modules |
| Controller Incoming | FlowRemoved | OF_Type10 OF_Type12 | Routing module decide version |
| Controller Outgoing | PacketOut | OF_Type | LinkDiscovery Routing |
| Controller Outgoing | FlowMod GroupMod TableMod | OF_Type10 OF_Type12 | Routing |
| Handshaking | Hello FeatureRequest/Reply ConfigureRequest/Reply StatsuRequest/Reply RoleRequest/Reply SetConfig | OF_Type10 OF_Type12 | Connection Switch Management |

Incoming messages to the generalized network controller may include a PacketIn message, a PortStatus message, and an error message. The message type of these messages may be OF_Type (e.g., these message may be translated into a version independent message) and the modules that process these messages may be any or all interested modules. Incoming messages to the network controller may also include FlowRemoved which may be either of an OF_Type10 or OF_Type12 depending on whether the message is from a OF switch using OF version 1.0 or an OF switch using OF version 1.2. The modules that may process these messages may include the routing module.

Outgoing messages from the said generalized network controller may include a PacketOut message which may comprise a message type of OF_Type and may be processed by a link discovery module and/or a routing module. Outgoing messages from the controller may also include FlowMod, GroupMod, and TableMod and each of these messages may be of either OF_Type10 or OF_Typ12 and may be processed by a routing module.

Handshaking messages (e.g., messages to announce, configured, and connect a device) may include Hello, FeatureRequest/Reply, ConfigureRequest/Reply, StatusRequest/Reply, RoleRequest/Reply, and SetConfig. These messages may be either OF_Type10 or OF_Type12 and may be processed by the connection module and/or the switch management module.

Figure 5:
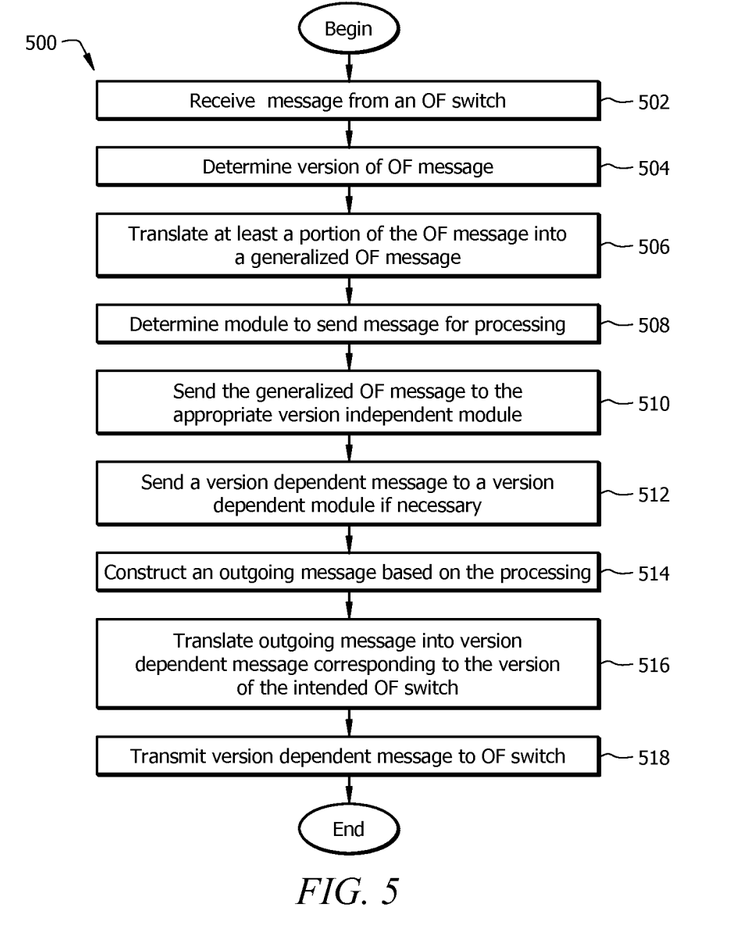
FIG. 5 is a flowchart of a method for receiving, translating, processing, and sending messages to and from a generalized network controller in an SDN network comprising OF switches of at least two different versions according to a disclosed embodiment.

FIG. 5 is a flowchart of a method 500 for receiving, translating, processing, and sending messages to and from a generalized network controller, such as OF network controller 102 in FIG. 1 or the network controller 200 in FIG. 2, in an SDN network comprising OF switches of at least two different versions according to a disclosed embodiment. The method 500 may begin at block 502 where the said generalized network controller may receive a message from an OF switch. At block 504, the generalized network controller may determine the version of the OF message. At block 506, the generalized network controller may translate at least a portion of the OF message into a generalized version independent message. At block 508, the generalized network controller may determine the module(s) to which to send the generalized version independent message and/or the original version dependent message for processing. At block 510, the generalized network controller may send the generalized version independent message to the appropriate version independent module(s) for processing. At block 512, the generalized network controller may send the original version dependent message to one or more version dependent modules if necessary or desired. At block 514, the generalized network controller may construct an outgoing message based on the processing. At block 516, the generalized network controller may translate the outgoing message into a version dependent message corresponding to the version of the OF switch to which the message is intended. At block 518, the generalized network controller may transmit the version dependent message to the OF switch, after which, the method 500 may end.

Figure 6:
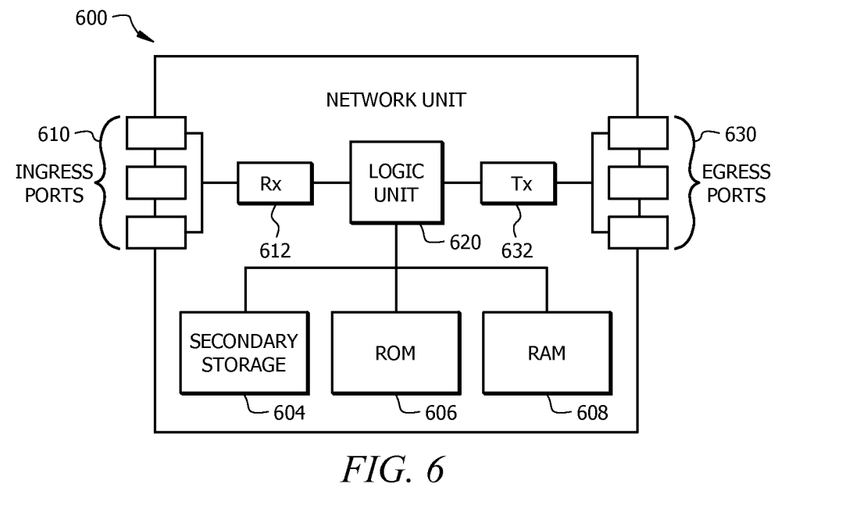
FIG. 6 is a schematic diagram illustrating an embodiment of a network unit, which may be any device that transports and processes data through the network.

FIG. 7 illustrates an embodiment of a network unit 600, which may be any device that transports and processes data through the network that has with sufficient processing power, memory resources, and network throughput capability to handle the necessary workload placed upon it. For instance, the network unit 600 may correspond to OF switches 104 or controller 102 described above. The network unit 600 may comprise one or more ingress ports or units 610 coupled to a receiver (Rx) 612 for receiving signals and frames/data from other network components. The network unit 600 may comprise a logic unit 620 to determine which network components to send data to. The logic unit 620 may be implemented using hardware, software, or both. The logic unit 620 may be implemented as one or more central processing units (CPUs) chips, or may be part of one or more application specific integrated circuits (ASICs). The network unit 600 may also comprise one or more egress ports or units 630 coupled to a transmitter (Tx) 632 for transmitting signals and frames/data to the other network components. The logic unit 620 may also implement or support the said generalized network controller methods and schemes described above. The components of the network unit 600 may be arranged as shown in FIG. 6.

The logic unit 620 may be in communication with memory devices including secondary storage 604, read only memory (ROM) 606, and random access memory (RAM) 608. The secondary storage 604 is typically comprised of one or more disk drives or tape drives and is used for non-volatile storage of data and as an overflow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for controlling a plurality of Open Flow (OF) switches corresponding to different OF standard versions in a network controller in a software defined network (SDN), comprising:

receiving at a receiver an incoming message from a first one of the OF switches, wherein at least two of the OF switches correspond to different non-compatible versions of an OF standard;

translating with a processor the incoming message into a version independent message;

processing with the processor the version independent message to generate a network management outgoing message to a second one of the OF switches; and translating the outgoing message into a version dependent message corresponding to a version compatible with the second one of the OF switches, wherein the version independent message comprises an abstracted message type OF_Type in an abstracted OF_Message format, wherein the incoming message and the outgoing message comprise a type selected from a group consisting of version dependent subclasses OF_Type10 and OF_Type12, and wherein the incoming message and the outgoing message comprise a format selected from a group consisting of version dependent subclasses OF_Message10 and OF_Message12.

2. The method of claim 1, further comprising determining with the processor the version of the incoming message.

3. The method of claim 1, wherein processing comprises determining a routing path for a data packet through the SDN, wherein the routing path comprises a first switch comprising a first version of an OF standard and a second switch of a second version of an OF standard, and wherein the first version and the second version are different.

4. The method of claim 1, wherein processing comprises determining a topology of the SDN network.

5. The method of claim 1, wherein processing comprises switch management.

6. The method of claim 1, wherein processing comprises device management.

7. The method of claim 1, wherein processing comprises link discovery.

8. The method of claim 1, wherein the first and second OF switch are the same OF switch.

9. A computer program product executable by a processor in a network controller in a software defined network (SDN), the computer program product comprising computer executable instructions stored on a non-transitory computer readable medium that when executed by the processor cause the network controller to perform the following:

receive an incoming message from a first one of a plurality of Open Flow (OF) switches, wherein at least two of the OF switches correspond to different non-compatible versions of an OF standard;

translate the incoming message into a version independent message;

process the version independent message to generate a network management outgoing message to a second one of the OF switches; and translate the outgoing message into a version dependent message corresponding to a version compatible with a second one of the OF switches.

10. The computer program product of claim 9, further comprising instructions stored on the non-transitory computer readable medium that when executed by the processor cause the network controller to determine a routing path for a data packet through the SDN wherein the routing path comprises a first switch comprising a first version of an OF standard and a second switch of a second version of an OF standard, wherein the first version and the second version are different.

11. The computer program product of claim 9, further comprising instructions stored on the non-transitory computer readable medium that when executed by the processor cause the network controller to determine the version of the incoming message.

12. The computer program product of claim 9, wherein the first and second OF switch are the same OF switch.

13. The computer program product of claim 9, further comprising instructions stored on the non-transitory computer readable medium that when executed by the processor cause the network controller to perform at least one of determining a topology of the SDN network, a switch management function, a device management function, and a link discovery function.

14. A generalized network controller in a software defined network (SDN), comprising:

a first transceiver connected to a first Open Flow (OF) switch comprising a first OF standard version configured to receive messages from the first OF switch and to transmit messages to the first OF switch;

a second transceiver connected to a second OF switch comprising a second OF standard version configured to receive messages from the second OF switch and to transmit messages to the second OF switch, wherein the first OF standard version is different from the second OF standard version, and wherein the first OF standard version is incompatible with the second OF standard version; and a processor coupled to the first and second transceivers and configured to control the first and the second OF switches.

15. The generalized network controller of claim 14, further comprising a message analyzer configured to decipher a version of an incoming message.

16. The generalized network controller of claim 15, further comprising a message normalizer coupled to the message analyzer and configured to extract features from the incoming message and construct a version independent incoming message.

17. The generalized network controller of claim 16, further comprising a version independent controller module and an abstract network control data model coupled to the message normalizer and configured to process the version independent incoming message.

18. The generalized network controller of claim 17, wherein the version independent controller module comprises at least one of a routing module, a topology module, a connection module, a switch management module, a device management module, a link discovery module, and a network information base (NIB).

19. The generalized OF controller of claim 17, further comprising a message translator coupled to the version independent controller module, wherein the message translator is configured to construct a version specific outbound message for one of the first and second OF switches.

20. The generalized network controller of claim 14, wherein the processor is configured to construct a path across the SDN for a data packet, wherein the path comprises OF switches comprising the first OF standard version, and OF switches comprising the second OF standard version.

\* \* \* \* \*